US006236868B1

(12) United States Patent
Lygas

(10) Patent No.: US 6,236,868 B1
(45) Date of Patent: May 22, 2001

(54) APPARATUS FOR SENSING THE PRESENCE OF A MOBILE TELEPHONE IN ITS HOLDER

(75) Inventor: Edward A. Lygas, San Marcos, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/086,972

(22) Filed: May 29, 1998

(51) Int. Cl.[7] .................................................. H04Q 7/32
(52) U.S. Cl. ........................ 455/569; 455/572; 455/41; 379/433
(58) Field of Search .................................. 455/550, 569, 455/572–573, 575, 90, 347–351, 41; 379/428, 433, 429, 432; 248/309.4, 671, 683; 324/207.11, 207.13, 207.15, 207.2, 207.22, 219, 260–61

(56) References Cited

U.S. PATENT DOCUMENTS

| 5,282,246 | * | 1/1994 | Yang | 379/455 |
| 5,325,045 | * | 6/1994 | Young et al. | 323/356 |
| 5,418,836 | * | 5/1995 | Yazaki | 455/569 |
| 5,542,105 | * | 7/1996 | Finch et al. | 455/575 |
| 5,544,227 | * | 8/1996 | Blust et al. | 455/426 |
| 5,588,041 | * | 12/1996 | Meyer, Jr. et al. | 455/569 |
| 5,596,567 | * | 1/1997 | deMuro et al. | 320/5 |
| 5,600,547 | * | 2/1997 | Kim | 363/22 |
| 5,706,000 | * | 1/1998 | Fukuzaki et al. | 341/5 |
| 5,754,962 | * | 5/1998 | Griffin | 455/569 |
| 5,826,196 | * | 10/1998 | Cuthrell | 455/462 |

* cited by examiner

Primary Examiner—William G. Trost
(74) Attorney, Agent, or Firm—Frommer, Lawrence & Haug, LLP; William S. Frommer; Glenn F. Savit

(57) ABSTRACT

A apparatus for sensing the presence of a mobile telephone within a holder for the telephone. A winding is located within either the telephone, the telephone's battery pack or a plug connected to the telephone. A magnetic element is disposed within a portion of the holder that is proximate to the winding when the telephone is present within the holder. Detection circuitry is coupled to the winding and detects, based on current flow through the winding, if the winding is in proximity to the magnetic element, which indicates that the telephone is present within the holder. The system may automatically enter a hands-free mode whenever the presence of the telephone within the holder is sensed. The magnetic element may be a transformer secondary to enable power to be delivered to other electronics within the holder, such as a light emitting element, whenever the telephone is present therein.

24 Claims, 6 Drawing Sheets

APPARATUS FOR SENSING THE PRESENCE OF A MOBILE TELEPHONE IN ITS HOLDER

BACKGROUND OF THE INVENTION

The present invention relates generally to mobile communications, and more particularly, to an apparatus for sensing the presence of a mobile telephone in its holder, e.g., during use in a moving vehicle, and optionally for delivering power to electronics within the holder.

Current mobile telephones, also commonly referred to as radiotelephones, cellular telephones, mobile stations, and personal communicators, typically include a connector port to permit the mobile phone to be temporarily hardwired to a base unit when the mobile phone is used in an automobile or other moving vehicle. The base unit forms part of a "car kit", which includes accessories such as a speakerphone, answering machine, data communications electronics, car-mounted antenna, etc. A mobile phone holder (or "cradle") is mounted to the dashboard, central glove compartment or pedestal mount. The holder retains the mobile phone when not in use or during speakerphone (hands-free) operation.

FIG. 1 illustrates a typical car kit set-up. A mobile phone 10 is retainable within a central slot 17 of a plastic holder 16 mounted to the automobile's dashboard 12. Mobile phone 10 is electrically connected via plug 14 and cord 18 to a portable base unit 20, which is typically mounted to the central glove compartment of the vehicle. Base unit 20 is connected to the vehicle's +12V power supply which powers the base unit and recharges the mobile phone's battery via leads within cable 18. Base unit 20 is usually connected to a car-mounted antenna. Battery charger/eliminator 24 and speakerphone electronics 22 are typically built into the base unit. Speakerphone electronics 22 includes an audio pickup as well as amplification electronics for driving an external speaker. The audio pickup may be located external to base unit 20, such as in the sun visor, by means of another hard wire connection from the base unit. A manually operated switch on the base unit is usually provided to activate the speakerphone and allow hands-free phone operation.

A concern of ubiquitous cell phone use while driving is driver distraction and its impact on vehicle safety. While current car kit designs, such as those employing hands-free operation or voice-activation electronics capable of performing automatic dialing, are intended to curtail driver distraction, new designs are sought to provide further improvement in this area.

In addition, there is a need for mobile phone devices for moving vehicles with improved ergonomics to facilitate use and enhance enjoyment of these devices.

SUMMARY AND OBJECTS OF THE INVENTION

It is, therefore, an object of the present invention to provide a mobile telephone apparatus with improved ergonomics.

It is another object of the invention to provide a means of sensing when an externally powered mobile telephone is placed within its holder.

It is an additional object of the invention to automatically deliver power to a mobile telephone holder whenever the mobile telephone is placed therein.

It is yet another object of the invention to sense the placement of a plug-connected object in a holder for the object.

Various other objects and advantages of the invention will become readily apparent to those of ordinary skill in the art, and the novel features thereof will be particularly pointed out in the appended claims.

In an illustrative embodiment of the invention, there is provided an apparatus for sensing the presence of a mobile telephone within a holder for the telephone. The apparatus includes a winding located within either the telephone, the telephone's battery or a plug connected to the telephone. A magnetic element capable of coupling to the winding is disposed within a portion of the holder that is proximate to the winding when the telephone is placed within the holder. Detection circuitry is coupled to the winding and detects, based on changes to the alternating current flow through the winding, if the winding is in proximity to the magnetic element, which indicates that the telephone is present within the holder.

When the telephone is present within the holder, the system may automatically enter a speakerphone (hands-free) mode, thereby freeing the user from activating a special switch to implement the same.

Optionally, the winding may be wrapped around a magnetic element within the holder to form a transformer secondary. In this case, power can be delivered to electronics within the holder via the transformer whenever the telephone is present on the holder. The holder electronics may include, for example, light emitting elements and/or a dialer integrated with the holder. The arrangement allows for signaling between the telephone electronics and the holder electronics via magnetic coupling.

BRIEF DESCRIPTION OF THE DRAWINGS

The following detailed description, given by way of example and not intended to limit the present invention solely thereto, will best be appreciated in conjunction with the accompanying drawings, in which like reference numerals denote like elements and parts, wherein.

DETAILED DESCRIPTION OF CERTAIN PREFERRED EMBODIMENTS

Certain preferred embodiments of the invention will now be described for use within a mobile telephone system adapted for use in a motor vehicle, e.g., automobile, boat, etc. However, it is understood that the mobile telephone embodiments of the invention may also be employed in stationary environments. In addition, certain embodiments of the invention may have other applications aside from mobile communications, such as for sensing placement of a plug-connected object in a holder and/or for supplying power from the plug to the object by magnetic coupling.

Figure 1:
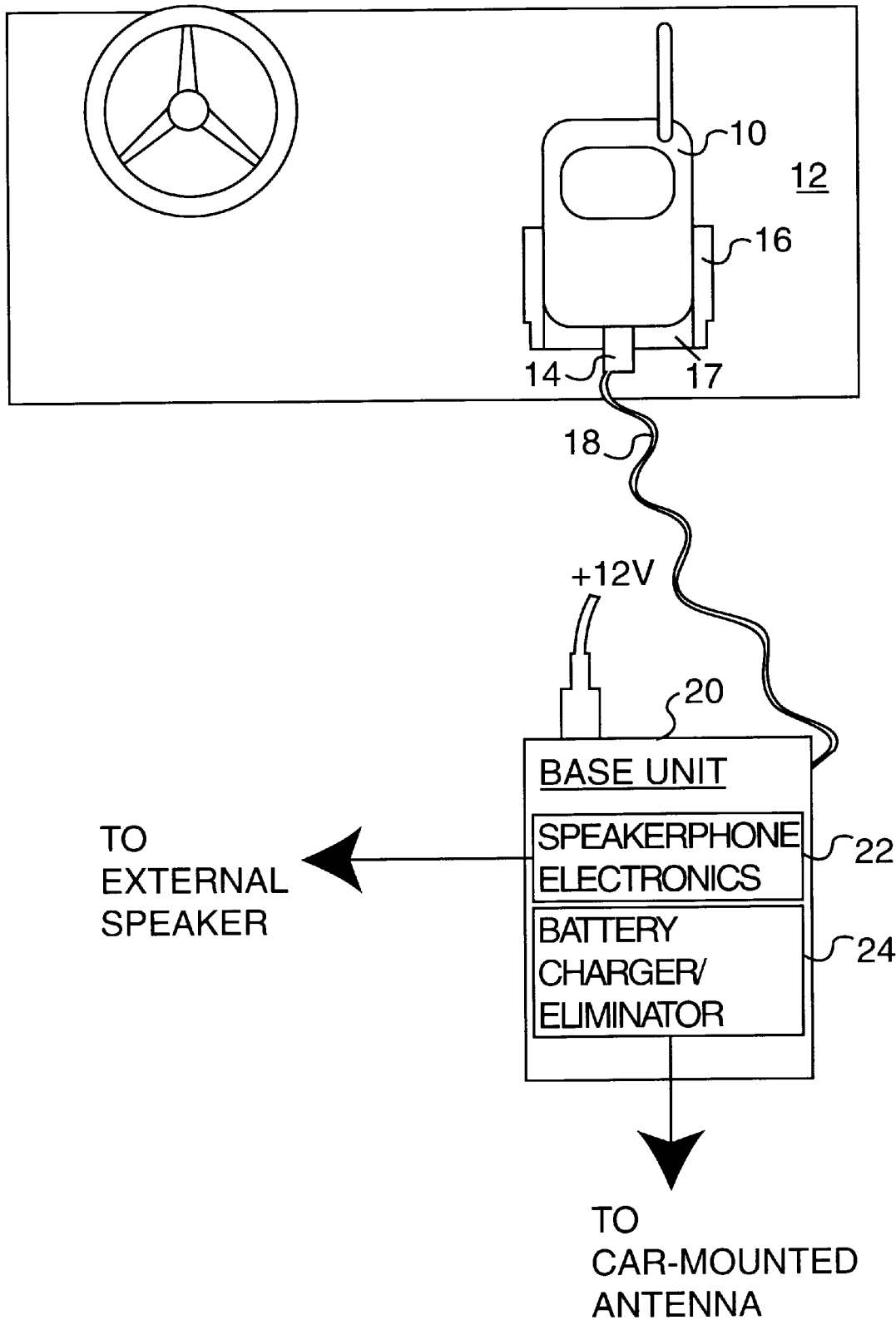
FIG. 1 illustrates a mobile telephone arrangement for use in a motor vehicle.
Figure 2:
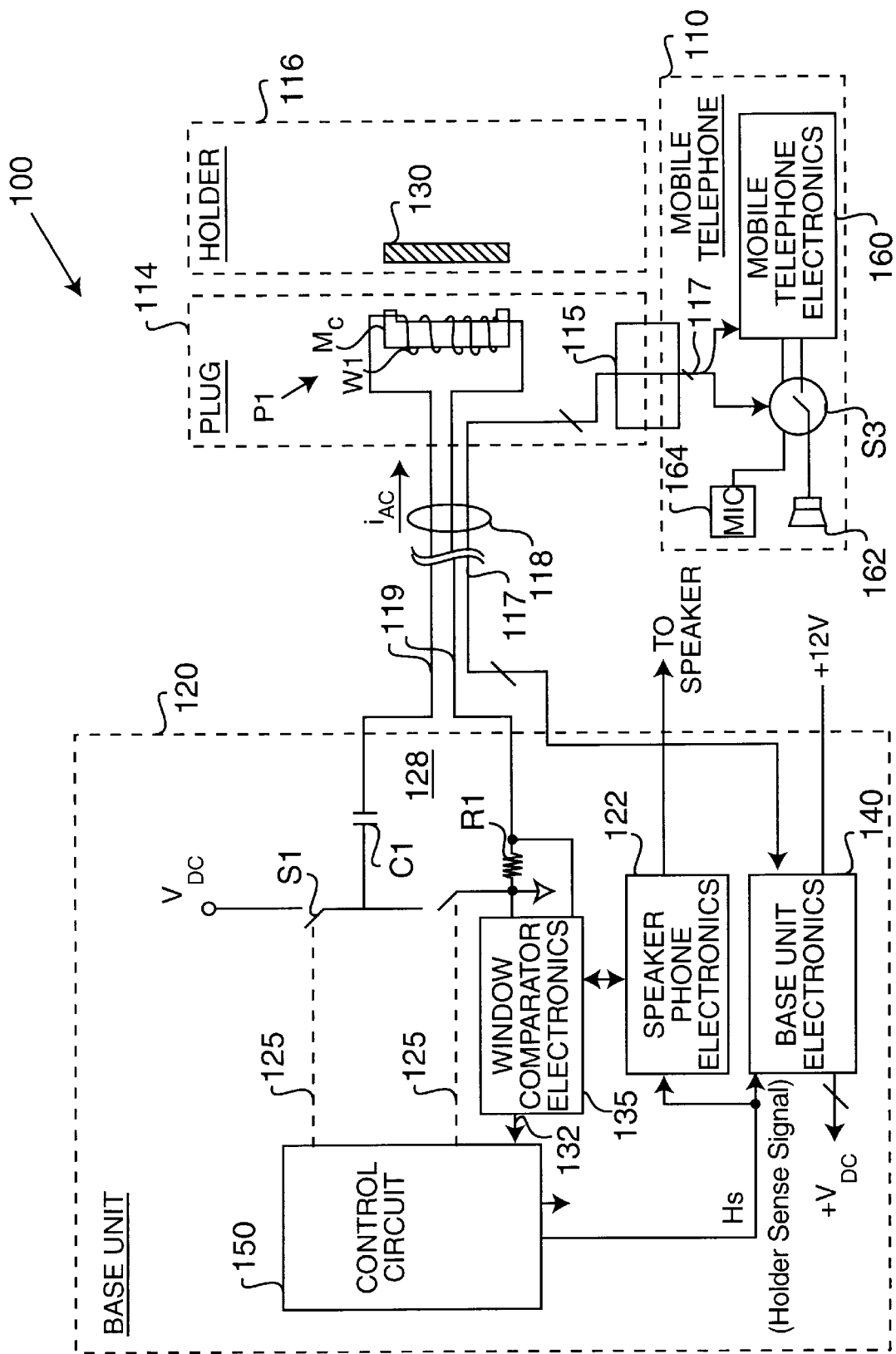
FIG. 2 is a schematic block diagram of a first embodiment of the present invention.

Referring to FIG. 2, a schematic block diagram of a mobile telephone apparatus 100 in accordance with the invention is shown. Apparatus 100 includes hand-held mobile telephone 110, plug 114, holder 116, cable 118 and base unit 120, all of which may be of generally the same shape and size as the respective components 10, 14, 16, 18 and 20 of FIG. 1. Wires 117 within cable 118 and plug 114 connect to electronics within telephone 110 via connector 115. Wires 117 transmit conventional signals and voltages between telephone 110 and base unit 120. Connector 115 is preferably a standard connector to allow a conventional telephone 110 to be utilized without the necessity of any modification thereto. The size and shape of the plug enclosure of plug 114, however, may be larger than that of a standard plug to accommodate a winding W1.

Winding W1 is preferably wrapped around a magnetic core $M_c$, e.g., a "c" ferrite or tape core, to form an electromagnet embodied as a transformer primary P1. A magnetic element 130 such as a ferromagnet material (e.g., ferrous material containing an alloy of nickel) is disposed within a portion of holder 116 that is adjacent to plug 114 when mobile telephone 110 is placed in holder 116. Magnetic element 130 may also be embodied as a transformer secondary as will be discussed in detail below. For example, in the arrangement as shown in FIG. 1 (with holder 116 substituted for holder 16, plug 114 for plug 14, and so forth), magnetic element 130 would be situated in the bottom portion of holder 116 proximal to plug 114. Thus, when mobile telephone 110 is placed within holder 116, the reluctance associated with primary P1 changes. By causing AC current $i_{AC}$ to flow through primary P1, and by monitoring that current, detection of the presence of telephone 110 within holder 116 can be accomplished. That is, the magnetic element within holder 116 creates a reluctance change when the mobile telephone is placed therein, resulting in different AC current flow through primary P1, which is then detected. Depending on the type of detection circuit employed, either the magnitude of the current or its frequency can be used to detect the change in reluctance.

In the present embodiment, a half-bridge, series resonant type of detection circuit 128 is utilized to detect the presence of telephone 110 within its holder 116. Detection circuit 128 is similar to that which is used in electronic ballasts for high intensity discharge lighting utilizing the off resonance condition of a capacitor C1 and inductance of a primary P1. Detection circuit 128 includes a control circuit 150, switches S1 and S2, current sense resistor R1, capacitor C1 and window comparator 135, all located within base unit 120, and coupled by leads 119 (within cable 118) to primary P1. Control circuit 150 controls the switching states of switches S1 and S2 such that switches S1, S2 are switched on and off in a complementary manner so as generate AC current $i_{AC}$ of a generally constant amplitude through primary P1 by selectively applying a DC supply voltage $V_{DC}$ through switch S1. Voltage $V_{DC}$ originates from base unit electronics 140 which converts the +12V input supply voltage to $V_{DC}$. Switches S1 and S2 may be FET, bipolar, or relay switches.

During the first half of the cycle, S1 is turned ON and S2 is OFF whereby current flows in the right-left direction through resistor R1. Voltage slowly builds up across capacitor C1 during this time. During the second half of the cycle, switch S1 is turned OFF and S2 is ON, such that the voltage $V_{DC}$ is isolated from the circuit, and the voltage stored within capacitor C1 is discharged through switch S2. Thus, during the second half of the cycle, current flows through resistor R1 in the left-right direction. Accordingly, AC current $i_{AC}$ is caused to continually flow through resistor R1 and primary P1. Resistor R1 provides the control circuit (via window comparator 132) with the signal necessary to hold the AC current constant by adjusting the frequency around the near resonant condition.

Current limiting is employed within control circuit 150 to keep the amplitude of current iAc constant. Any change of the reluctance associated with primary P1 will alter the frequency. The on-off switching frequency of switches S1 and S2 is thus controlled by control circuit 150 in accordance with the rate at which the current through resistor R1 reaches a predetermined current limit. That rate is in turn dependent on the reluctance of primary P1. Therefore, the frequency of the current (or switching frequency of the switches) is monitored within control circuit 150 to determine whether the frequency is a first expected frequency f1 or a second, higher expected frequency f2. Frequency f1 is expected when telephone 110 is within holder 116, corresponding to a first reluctance condition attained when magnetic core $M_c$ is proximate magnetic element 130. Frequency f2 is expected when telephone 110 is outside holder 116, corresponding to a second reluctance condition attained when the magnetic core is distant from the magnetic element.

More specifically, when power to base unit 120 is turned on via a power switch on the unit, control circuit 150 initially closes switch S1 and opens switch S2. This causes an initial current surge through the RLC circuit series loop of components C1, P1 and R1. High impedance window comparator electronics 135 detects the current flow through resistor R1 based on the voltage thereacross (or based on the magnetic field produced by the current). Window comparator electronics 135 outputs a logic signal on line 132 which is a first logic level when the current exceeds a predetermined threshold $i_{MAX}$, or a second logic level when the current reverses and falls below another threshold $i_{MIN}$.

Control circuit 150 includes logic for continually monitoring the output of window comparator electronics 135. As soon as $i_{AC}$ changes from below $i_{MAX}$ to above that threshold, control circuit 150 senses the output signal change from window comparator electronics 135 and reverses the logic state of the complementary control signals on lines 125 such that switch S1 is turned OFF and switch S2 is turned ON, whereby the second half of the AC cycle begins. The current $i_{AC}$ is monitored in an analogous manner during the second half of the cycle, and when it falls below $i_{MIN}$, the logic states of the complementary control signals are reversed again. Consequently, current limiting is achieved and a constant amplitude AC current is generated. As the switching continues, the frequency of $i_{AC}$ is monitored based on the current sense signal on line 132 to determine if it is closer to expected frequency f1 or f2. The relatively higher frequency f2 indicates that magnetic element 130 is farther from winding W1, whereas the lower frequency f1 indicates the presence of the magnetic element in proximity to winding W1.

It is noted that instead of control circuit 150 controlling the switching states of switches S1 and S2 based on the output logic of window comparator electronics 135, the output of window comparator electronics 135 on line 132 can be supplied directly to switches S1 and S2 to accomplish the same end. For instance, switch S1 may be embodied as a PFET or PNP transistor and switch S2 as an NFET or NPN transistor, and the signal on line 132 can be applied to the gates or bases of each transistor switch S1, S2 to control the switching thereof in a complementary fashion. Control circuit 150 would still monitor the output of window comparator electronics 135 to determine the frequency of $i_{AC}$.

Control circuit 150 produces a holder sense signal $H_S$ which, for example, is a logic high for the lower frequency state and a logic low for the higher frequency state (or vice versa). Speakerphone electronics 122 receives signal $H_s$ and is automatically activated whenever $H_s$ is high and deactivated when it is low. Concomitantly, base unit electronics 140 is responsive to signal $H_s$ to deactivate the "privacy mode" of telephone 110 whenever signal $H_s$ indicates the telephone is in its holder. The deactivation is carried out by applying a predetermined control signal from the base unit electronics to switch S3 of telephone 110 via one of leads 117 to open the switch and thereby deactivate microphone 164 and speaker 162. Likewise, when telephone 110 is removed from holder 116, holder sense signal $H_s$ changes logic state to thereby deactivate speakerphone electronics 122. Concurrently, base unit electronics 140 forwards a suitable control signal to telephone 110 to activate microphone 164 and speaker 162.

Figure 3:
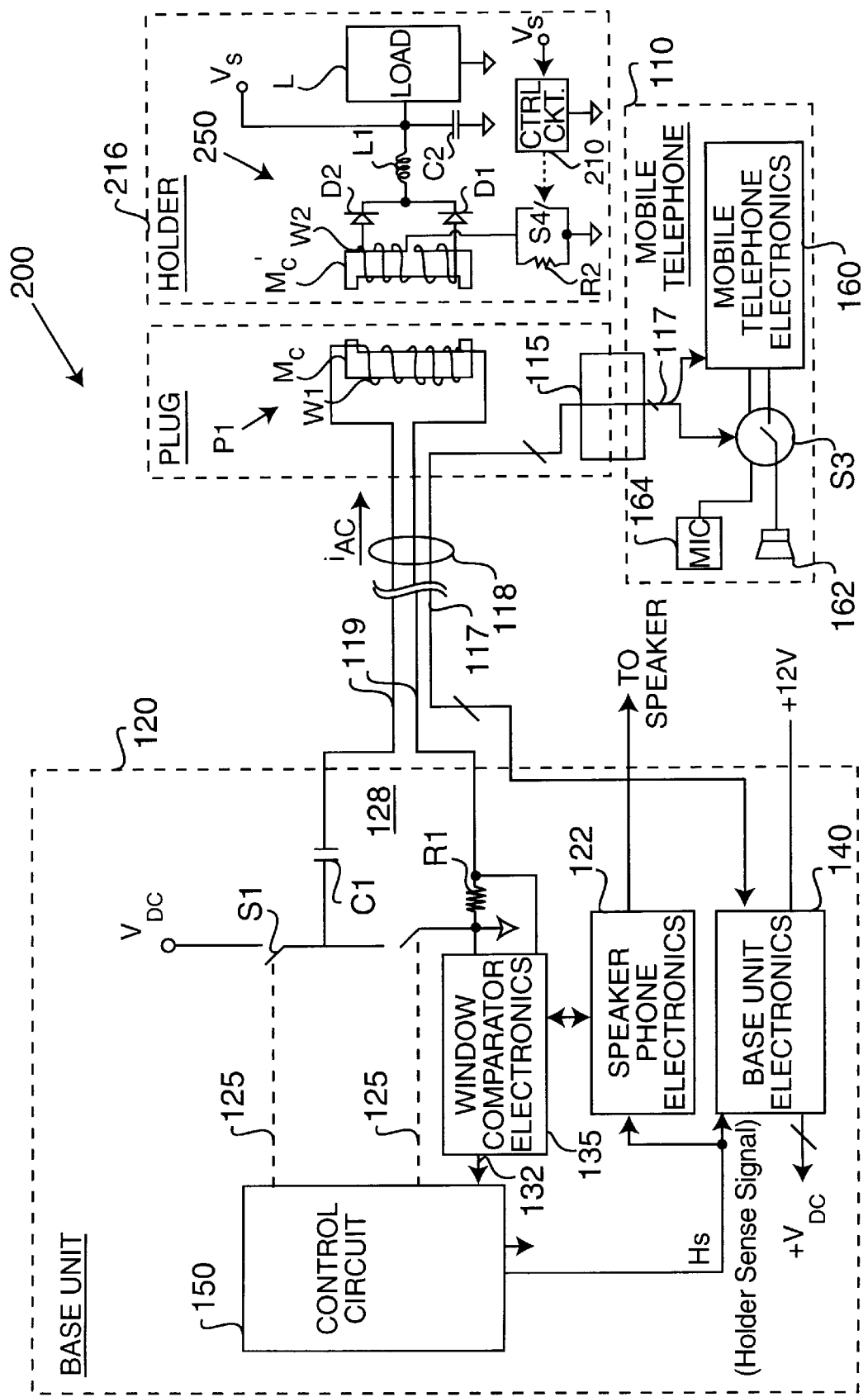
FIG. 3 is a schematic block diagram of a second embodiment of the invention.

With reference now to FIG. 3, there is shown another embodiment of a telephone apparatus in accordance with the invention, designated as 200. This embodiment includes the same or similar base unit 120, hand-held telephone 110 and plug 114 as described previously in connection with apparatus 100 of FIG. 2. Apparatus 200 utilizes a holder 216 in place of holder 116 of FIG. 2. Instead of using ferromagnetic material as the magnetic element to influence the reluctance of primary P1 when the telephone is in its holder, holder 216 employs a transformer secondary S formed of a winding W2 wound about a magnetic core $M_c'$. When telephone 110 is placed within holder 216, secondary S is in proximity to primary P1, which has the same general effect on the reluctance of primary P1 as does magnetic element 130. That is, secondary S and its loading electronics causes the frequency of current $i_{AC}$ to change, and this change is detected by control circuit 150 in essentially the same manner as described above. (Alternatively, change in the magnitude of current $i_{AC}$ is detected by control circuit 150.) Thus, the presence (or absence) of telephone 110 in holder 216 is detected, and the speakerphone is automatically activated or deactivated accordingly.

Figure 4:
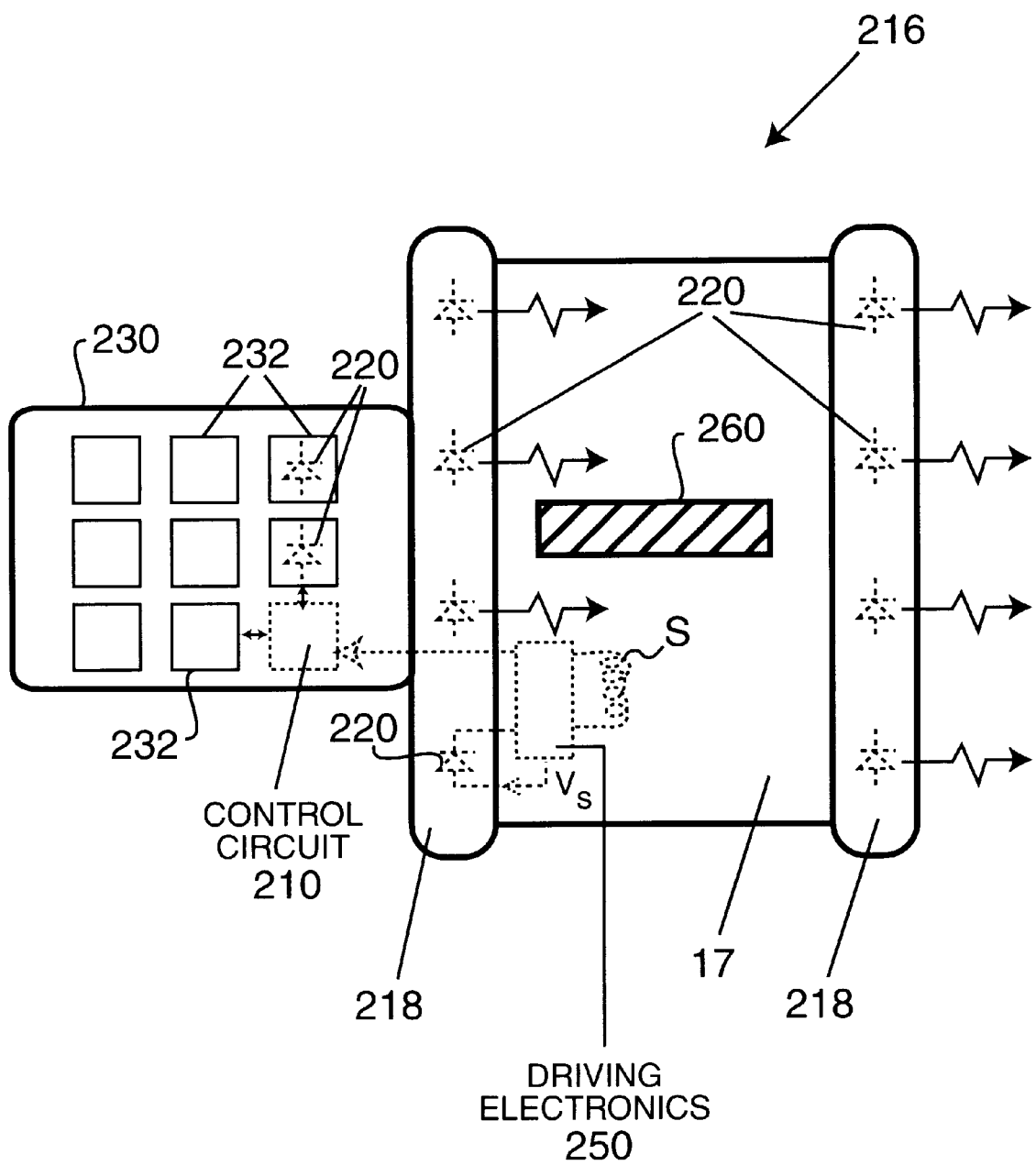
FIG. 4 illustrates a mobile telephone holder with an integrated dialer capable of being powered by the circuit of FIG. 3.

When the telephone is in holder 216, power is delivered to electronics in holder 216 by means of magnetic coupling from primary P1 to secondary S. The delivered power may be utilized, e.g., to illuminate light emitting elements within holder 216 and/or to drive a telephone dialer integrated with the holder. For example, as shown in FIG. 4, which is a front view of an illustrative holder 216, light emitting elements 220 such as light emitting diodes may be distributed within side ribs 218. A dialer 230 with keys 232 extends from the side of the holder. Light emitting elements 220 may be included within the keys 232 of dialer 230. Transformer secondary S is located inside the lower central region of slot 17. An opening 260 is provided within slot 17 to accept a clasp on telephone 110 to hold it in place within the holder. Driving electronics 250 packaged inside slot 217 receive voltage from secondary S and drive light emitting elements 220 as well as control circuit 210 within dialer 230. Accordingly, when telephone 110 is present within holder 216, light emitting elements 220 are activated to emit light, and dialer 230 is activated to permit the user to dial while in the speakerphone mode by depression of keys 232 rather than through the keys on telephone 110.

With continuing reference to FIG. 3, driving electronics 250 include a pair of diodes D1 and D2 which rectify the AC voltage at the terminals of secondary S. The rectified voltage is filtered by a low pass filter formed of inductor L1 and capacitor C2 to provide a filtered output voltage $V_s$ that drives load L (e.g., light emitting elements 220) and control circuit 210. By altering the load conditions on secondary S, the impedance of primary P1 is changed. Load conditions may be altered by means of control circuit 210 selectively opening and closing a switch S4 that is coupled in parallel with a resistor R4. By so doing, the effect of such load variation on the impedance of the primary can be monitored by control circuit 150 within base unit 120, by monitoring either the amplitude or frequency of current $i_{AC}$ as sensed by a current sensor. Consequently, signaling is achieved by opening and closing switch S4 to produce different, but predicted, current characteristics of $i_{AC}$. As the load changes between, for example, two states, i.e., corresponding to switch S4 being on or off, the AC current within control circuit 150 of the base unit is kept constant by the current limiting technique discussed above.

Figure 5:
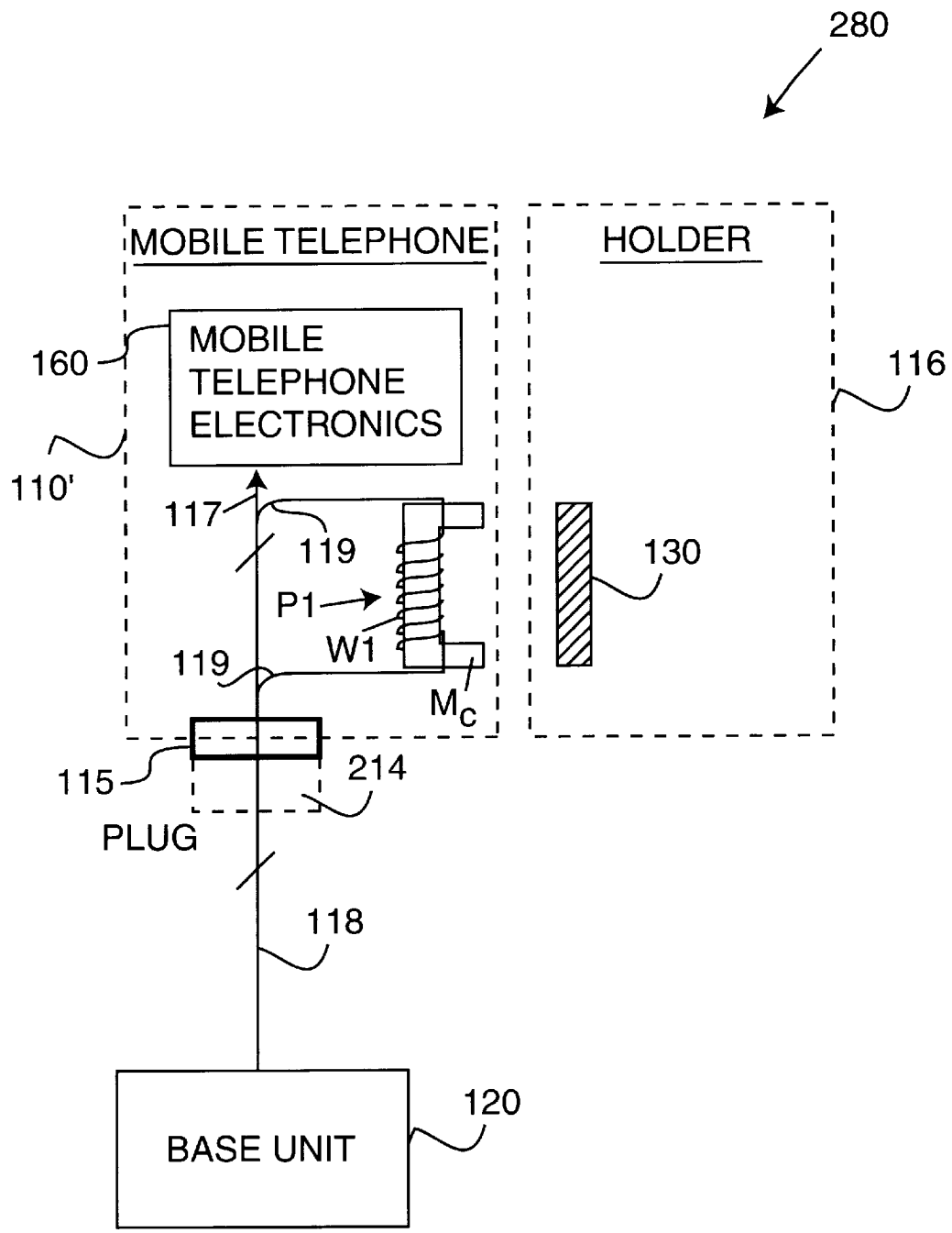
FIGS. 5 and 6 illustrate alternative embodiments of the invention in which the holder sensing winding is located in the mobile telephone and the mobile telephone's battery pack, respectively.

In the embodiments described above, the transformer primary P1 is located within the plug connecting to the mobile telephone. As an alternative, the primary can be located within the mobile telephone itself, as shown in the embodiment of FIG. 5. Telephone apparatus 280 includes essentially the same holder 116 (or 216) and base unit 120 (with detection circuit 128) described above. Primary P1, however, is absent from plug 214 and instead is embodied within mobile telephone 110' at a location which is adjacent magnetic element 130 when telephone 110' is present within holder 116 (or adjacent transformer secondary S when holder 216 is used).

Figure 6:
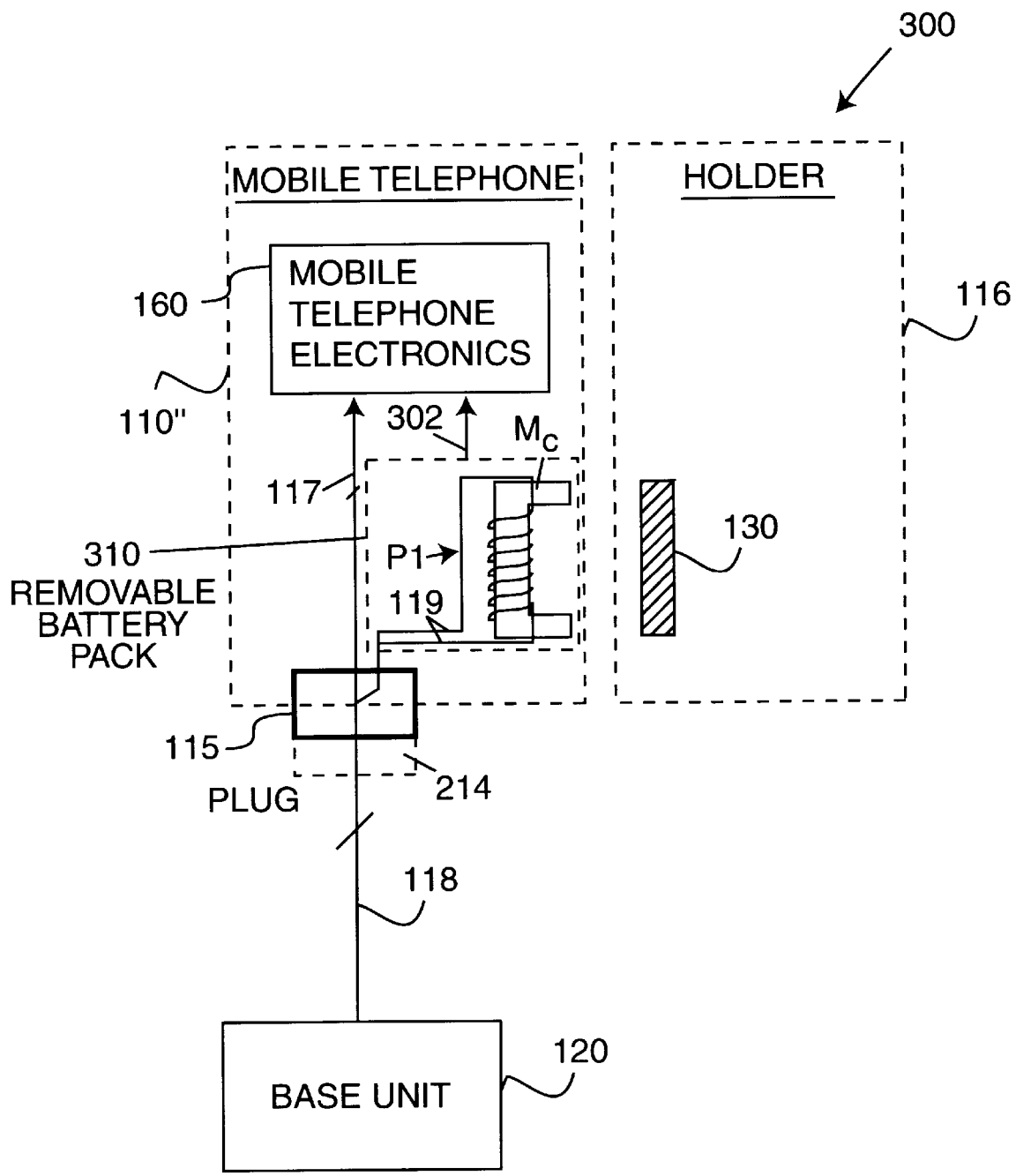

Referring to FIG. 6, another embodiment of the invention, telephone apparatus 300, employs primary P1 within a removable battery pack 310. The location of primary P1 is adjacent magnetic element 130 (or secondary S) when telephone 110" is placed within holder 116 (or 216). In the shown embodiment, battery pack 310 and telephone 110" are each equipped with suitable electrical contacts so as to enable leads 119 to make proper electrical connection from cable 118 to the opposite ends of primary P1. In the alternative, battery pack 310 can be provided with a separate connector to connect to a short, secondary cable (with leads 119) that branches off from cable 118. In any event, battery pack 310 provides battery power on leads 302 to mobile telephone electronics 160 in a conventional manner.

While the present invention has been particularly shown and described in conjunction with preferred embodiments thereof, it will be readily appreciated by those of ordinary skill in the art that various changes and modifications may be made to the disclosed embodiments without departing from the spirit and scope of the invention. For example, the invention may be employed to sense an object other than a telephone within a holder for the object, and optionally, to deliver power to that holder. Accordingly, all such changes and modifications are intended to be included within the scope of the invention as defined by the appended claims.

What is claimed is:

1. An apparatus for sensing the presence of a mobile telephone within a holder for said telephone, comprising:

a winding located within one of said telephone, a battery pack of said telephone, and a plug connected to said telephone;

a magnetic element disposed within a portion of said holder that is proximate to said winding when said telephone is present within said holder; and detection circuitry coupled to said winding for detecting, based on current flow through said winding, if said winding is in proximity to said magnetic element which indicates that said telephone is present within said holder;

wherein said detection circuitry comprises: a resistive-capacitive (RC) circuit, including a current sense resistor coupled to said winding; and switching circuitry for switchably coupling a source of potential to said RC circuit so as to generate an AC current through said winding, with frequency of said AC current being detected and determinative of whether the telephone is present within the holder.

2. The apparatus of claim 1 wherein said winding is located within said plug.

3. The apparatus of claim 1 wherein said winding is located within said telephone.

4. The apparatus of claim 1 wherein said winding is located within a removable battery pack of said telephone.

5. The apparatus of claim 1 wherein said magnetic element comprises ferromagnetic material.

6. The apparatus of claim 1 wherein:
said winding is wrapped around a magnetic core to form a transformer primary;
said magnetic element comprises a transformer secondary; and
said holder includes electronics that are activated by power induced in said secondary by magnetic coupling from said primary when said telephone is present within said holder.

7. An apparatus for sensing the presence of a mobile telephone within a holder for said telephone, comprising:
a primary winding located within one of said telephone, a battery pack of said telephone, and a plug connected to said telephone;
a secondary winding disposed within a portion of said holder that is proximate to said primary winding when said telephone is present within said holder; and
detection circuitry coupled to said primary winding for detecting, based on current flow through said primary winding, if said primary winding is in proximity to said secondary winding which indicates that said telephone is present within said holder;
wherein said holder includes electronics that are activated by power induced in said secondary winding by magnetic coupling from said primary winding when said telephone is present within said holder, said activated electronics including a light emitting element that illuminates said holder when said telephone is placed therein.

8. The apparatus of claim 7 wherein said electronics include an electronic dialer integrated with said holder.

9. The apparatus of claim 1 wherein said switching circuitry comprises a pair of switches, and said apparatus further comprises a control circuit which causes said pair of switches to switch on and off in a complementary manner.

10. The apparatus of claim 9, further comprising window comparator electronics coupled across said sense resistor for sensing AC current flow through said resistor and providing a logic output signal of a first level when said AC current exceeds a first threshold and of a different logic level when said AC current falls below a second threshold; and a control circuit for monitoring the logic output of said window comparator and based thereon, determining whether said telephone is present within said holder.

11. The apparatus of claim 10 wherein said switches are switched in accordance with the output signal of said window comparator so as to maintain said AC current at a substantially constant amplitude.

12. The apparatus of claim 1, further comprising a cable connected to said plug and a base unit coupled to said telephone via said cable, said base unit housing said detection circuitry.

13. The apparatus of claim 1, further comprising speakerphone electronics to permit hands-free operation of said telephone, said speakerphone electronics being automatically activated in response to a signal from said detection circuitry indicating that said telephone is present within said holder.

14. An apparatus for sensing the presence, within a holder, of an electronic device removable from said holder, comprising:
a primary winding located within a plug connected to said electronic device;
a secondary winding disposed within a portion of said holder that is proximate to said electronic device when said electronic device is present within said holder;
detection circuitry coupled to said primary winding for detecting, based on current flow through said primary winding, if said primary winding is in proximity to said secondary winding which indicates said electronic device is present within said holder; and
said holder includes a light emitting element that is activated by power induced in said secondary winding when the electronic device is placed within the holder.

15. The apparatus of claim 14 wherein said primary and secondary windings are each wrapped around a magnetic core.

16. The apparatus of claim 15 wherein said detection circuitry comprises:
a resistive-capacitive (RC) circuit coupled to said primary winding;
a source of potential switchably coupled to said RC circuit via a pair of switches so as to generate an AC current through said primary winding, with frequency of said AC current being detected and determinative of the presence of the electronic device within the holder.

17. The apparatus of claim 16, further comprising a control circuit for controlling switching of said switches, and said apparatus further includes means for current-limiting said AC current such that said AC current is of a substantially constant amplitude.

18. A holder for a mobile telephone comprising:
a housing;
a transformer secondary disposed within said housing; and,
a load coupled to said secondary, said load receiving driving power from a transformer primary associated with said telephone through said secondary via magnetic coupling when said telephone is present within said holder;
wherein said transformer primary exhibits an impedance; and said load includes means for changing the impedance of said transformer primary by altering the load conditions on said secondary to provide digital signaling from said holder that is monitorable by sensing changes in current supplied to said transformer primary.

19. The holder of claim 18 wherein said means for changing the impedance comprises coupling means for coupling said secondary to a reference potential and means for varying the impedance of said coupling means.

20. The holder of claim 19 wherein said coupling means is a resistor and said means for varying the impedance of said coupling means is a switch connected in parallel with said resistor.

21. Mobile telephone apparatus comprising:
a base unit for supplying power;
a mobile telephone unit connected to said base unit for receiving current from said base unit, said mobile telephone unit including a transformer primary to which said current is supplied, said transformer primary exhibiting an impedance;

a holder for said mobile telephone unit and including a transformer secondary magnetically coupled to said transformer primary;

a load coupled to said transformer secondary, said load receiving driving power from said transformer primary through said transformer secondary and including means for changing the impedance of said transformer primary by altering the load conditions on said transformer secondary to thereby vary the current supplied to said transformer primary and provide digital signaling from said holder via said mobile telephone unit to said base unit as a function of the varied current.

22. An apparatus for sensing the presence of a mobile telephone within a holder for said telephone, comprising:

a winding located within a plug connected to said mobile telephone;

a magnetic element disposed within a portion of said holder that is proximate to said winding when said telephone is present within said holder; and detection circuitry coupled to said winding for detecting, based on current flow through said winding, if said winding is in proximity to said magnetic element which indicates that said telephone is present within said holder.

23. The apparatus of claim 22 wherein said plug is integrated with a cable connecting said mobile telephone to a base unit containing said detection circuitry.

24. The apparatus of claim 22 wherein said plug consisting essentially of: said winding; wires that connect said winding to a base unit containing said detection circuitry; and a connector portion electrically connecting said mobile telephone to said base unit.

* * * * *